Feb. 27, 1968  H. L. FUNK  3,371,200
AVERAGING AND DIFFERENCING SYSTEM
Filed Aug. 31, 1964
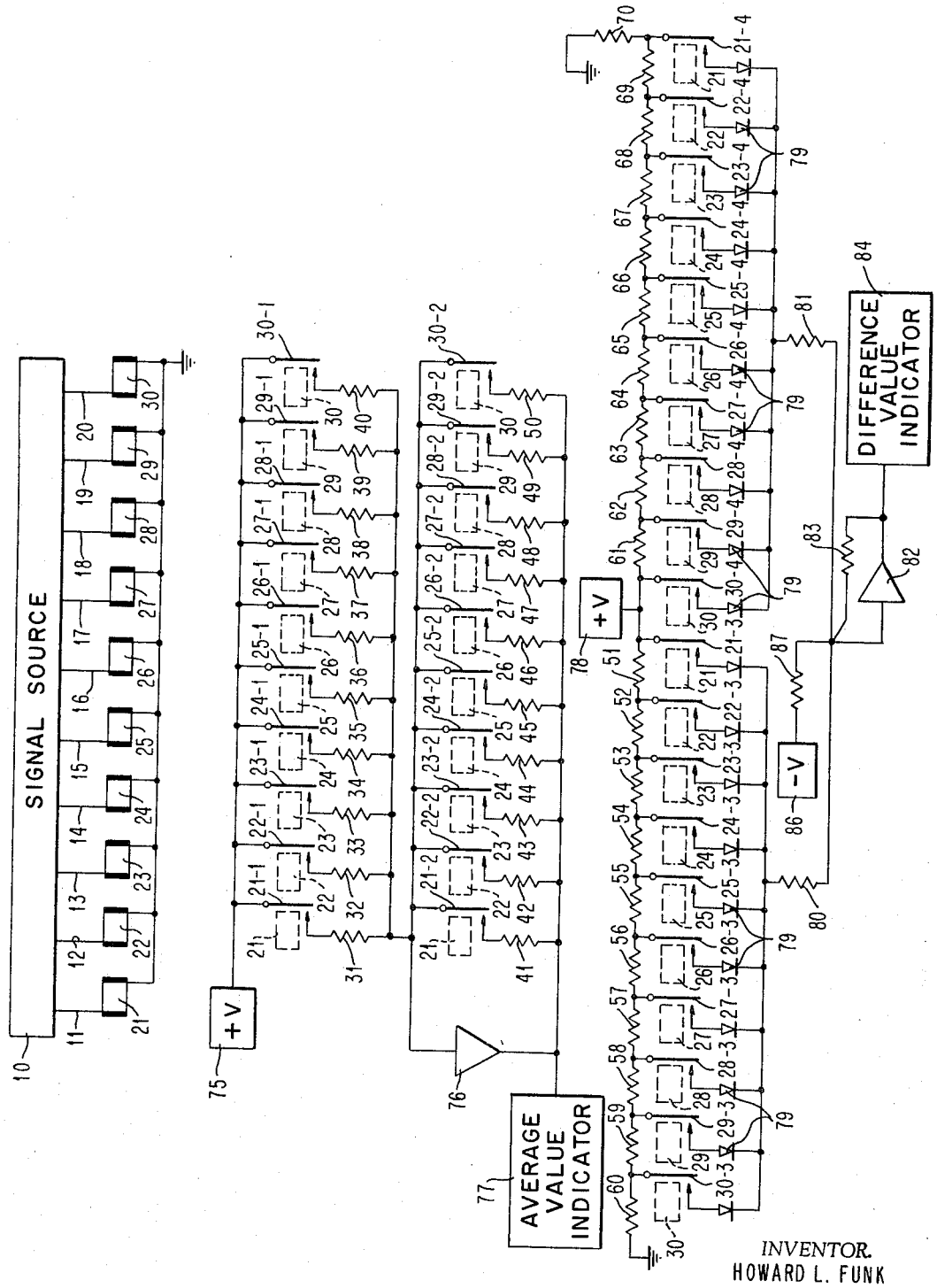
INVENTOR.
HOWARD L. FUNK
BY
*John J. Goodwin*
ATTORNEY United States Patent Office 3,371,200
Patented Feb. 27, 1968

3,371,200
AVERAGING AND DIFFERENCING SYSTEM
Howard L. Funk, Yorktown Heights, N.Y., assignor to International Business Machines Corporation, New York, N.Y., a corporation of New York
Filed Aug. 31, 1964, Ser. No. 393,267
5 Claims. (Cl. 235—193)

ABSTRACT OF THE DISCLOSURE

An averaging and differencing system wherein the average value of a group of separately valued signals is determined and where the absolute difference between the highest and lowest value signals is likewise determined. A plurality of signals actuate separate relay coils which close a plurality of sets of switches to form two associated voltage divider networks. Specific interconnection of the impedances and their precise value during any set of operating conditions determines the above-mentioned values.

The present invention relates to a system for providing numerical characteristics of a plurality of separate input signals, and more particularly to a system responsive to a plurality of numerical signals for providing the average value of the signals and the absolute difference between the highest and the lowest ones of the signals.

There are many applications for a circuit which indicates the average value of a plurality of values as well as the difference between the highest and the lowest values of said plurality. An example is in electronic counter measure systems wherein devices such as the carcinotron are used for electronic jamming. In such systems the jamming signals are transmitted over a band of frequencies determined by discretely received signal frequencies. The jamming signal must have the appropriate center frequency (the average of the received frequencies) and the appropriate sweep width (the difference between the highest and lowest received frequencies).

An object of the present invention is to provide a system for determining the average value of a plurality of numerical quantities.

Another object of the present invention is to provide a system as described for further determining the difference between the lowest and the highest ones of the plurality of numerical quantities.

The foregoing and other objects, features and advantages of the invention will be apparent from the following more particular description of a preferred embodiment of the invention, as illustrated in the drawing.

In the drawing:

The drawing shows a schematic diagram of a system following the principles of the present invention.

Referring to the drawing, a plurality of input leads 11, 12, 13, 14, 15, 16, 17, 18, 19, and 20 are shown connected to a signal source 10. Signal source 10 may, for example, be responsive to received signals of various frequencies and provide signals on one or more of the leads 11 through 20, the signal on each lead being representative of a particular received frequency. For example, a signal applied on lead 11 represents a frequency of 1 mc., on lead 12 a frequency of 2 mc., on lead 13 a frequency of 3 mc., on lead 14 a frequency of 4 mc., and so on to a signal applied on lead 20 representing a frequency of 10 mc.

The signal on lead 11 energizes relay coil 21 which closes switches 21–1, 21–2, 21–3, and 21–4, the energization of coil 22 closes switches 22–1, 22–2, 22–3, and 22–4, the energization of coil 23 closes switches 23–1, 23–2, 23–3 and 23–4, the energization of coil 24 closes switches 24–1, 24–2, 24–3, and 24–4, the energization of coil 25 closes switches 25–1, 25–2, 25–3, and 25–4, the energization of coil 26 closes switches 26–1 through 26–4, the energization of coil 27 closes switches 27–1 through 27–4, and so on to coil 30 which closes switches 30–1 through 30–4. The connection between each coil and its related four switches is not shown in the drawing for simplicity, however, the switches are designated such that the number preceding the hyphen in each of the switch reference numerals is the same as its associated coil and the associated coil is shown in dotted lines next to each of the switches.

Switches 21–1, 22–1, 23–1, 24–1, 25–1, 26–1, 27–1, 28–1, 29–1, and 30–1 are arranged in parallel and are coupled on one side to a source of potential 75. The other side of each of the switches 21–1 through 30–1 are connected respectively through resistors 31 through 40 to the input of an operational amplifier 76. Between the output and input of operational amplifier 76 is a feedback path including the switches 21–2, 22–2, 23–2, 24–2, 25–2, 26–2, 27–2, 28–2, 29–2, and 30–2.

Each of the parallel connected switches 21–1, 22–1, 23–1, . . . , 30–1 has a resistor connected in series therewith, the resistors being respectively designated 31, 32, 33, 34, 35, 36, 37, 38, 39, and 40. Likewise, each of the parallel connected switches 21–2, 22–2, 23–2, . . . , 30–2 has a resistor connected in series therewith, the resistors being respectively designated 42, 42, 43, 44, 45, 46, 47, 48, 49, and 50.

Each of the resistors 31 through 40 has a different value such that when the associated switch is closed a current is produced by source of potential 75 which is representative of the frequency of the input signal associated with the switch. For example, let the value of source of potential 75 be +20.00 volts and resistor 31 be 20,000 ohms. When switch 21–1 is closed as a result of a received signal of frequency 1 mc. energizing coil 21, a current of 1 milliamp will flow through resistor 31 and is representative of the 1 mc. frequency. Likewise, resistor 32 is 10,000 ohms so that when switch 22–1 is closed as a result of a received signal of 2 mc. frequency a 2-milliamp current flows through resistor 32. Resistor 33 is 6,667 ohms so that when switch 13 is closed as a result of a received signal of 3 mc. frequency, a 3-milliamp curent flows through resistor 33. Likewise, resistor 34 is 5,000 ohms, resistor 35 is 4,000 ohms, resistor 36 is 3,330 ohms, resistor 37 is 2,857 ohms, resistor 38 is 2,500 ohms, resistor 39 is 2,222 ohms, and resistor 40 is 2,000 ohms. Thus, when switch 24–1 is closed a 4-milliamp current flows through resistor 34, when switch 25–1 is closed a 5-milliamp current flows through resistor 35, when switch 26–1 is closed a 6-milliamp current flows through resistor 36, when switch 27–1 is closed a 7-milliamp curent flows through resistor 37, when switch 28–1 is closed an 8-milliamp current flows through resistor 38, when switch 29–1 is closed a 9-milliamp current flows through resistor 39, and when switch 30–1 is closed a 10-milliamp current flows through resistor 40.

Each of the parallel connected resistors 41, 42, 43, 44, . . . , 50 has a value of 1,000 ohms. It was previously stated that switches 21–1 and 21–2 close together, switches 22–1 and 22–2 close together, switches 23–1 and 23–2 close together and so on to switches 30–1 and 30–2 which close together.

In an operational amplifier such as amplifier 76, the feedback current is equal in magnitude to the total input current. Thus, if coil 21 is energized by a received signal of 1 mc. frequency, switches 21–1 and 21–2 (as well as 21–3 and 21–4 to be later explained) will close. A 1 milliamp current will be conducted by resistor 31 and applied as an input current to amplifier 76. A feedback current of 1.00 milliamp will be conducted by resistor 41, and the voltage at the output of amplifier 76 applied to average value indicator 77 will be 1.00 volt which is representative of the 1.00 mc. frequency of the received signal.

If three received signals of 1.00 mc., 6.00 mc. and 8.00 mc. (average value 1+6+8 divided by 3=5) were applied, coils 21, 26, and 28 would be energized and switches 21–1, 21–2, and 26–1 and 26–2, and 28–1 and 28–2 would close. Thus, resistors 31, 36, and 38 are connected in parallel for a total resistance of 1,334 ohms, which results in an input current to amplifier 76 of 15.00 milliamps. There is, therefore, a total feedback current through the three parallel feedback resistors 41, 46, and 48 of 15 milliamps. The three 1,000 ohm resistors in parallel have a total resistance of 333.334 ohms which result in an amplifier output voltage of 5 volts, which is representative of the average value of the received signal frequencies.

It can be shown that a voltage will always be produced at the output of operational amplifier 76 which is the direct analog of the average value of the frequencies of any number or combination of input signals from source 10. This analog voltage may be applied to a suitable average value indicator 77, for example, a voltmeter having a dial with frequency indicia. It is not necessary that the values set forth in the example be employed, only the relative relationships. For example, if potential source 75 were 10.00 volts, each of the resistor values 31 through 50 would be halved.

Switches 21–3, 22–3, 23–3, 24–3, . . . , 30–3 are connected on one side to separate junctions between a plurality of equal voltage divider resistors 51, 52, 53, 54, 55, 56, 57, 58, 59, and 60. The top end of resistor 51 is connected to a potential source 78, for example, +10.00 volts, and the bottom end of resistor 60 is connected to ground level. The resistors 51 through 60 are each 1.00 ohm so that the potential at the one side of switch 21–3 is 10.00 volts, the potential at switch 22–3 is 9.00 volts, the potential at switch 23–3 is 8.00 volts and so on to switch 30–3 which has a potential of 1.00 volts applied thereto. In the same manner one side of each of the switches 21–4, 22–4, 23–4, 24–4, . . . , 30–4 is connected to a separate junction between a plurality of 1.00 ohm voltage divider resistors 61, 62, 63, 64, 65, 66, 67, 68, 69, and 70. The top end of resistor 61 is connected to the potential source 78 and the bottom side of resistor 70 is connected to ground potential. The order of connection of switches 21–4 through 30–4 is opposite to the order of connection of switches 21–3 through 30–3. Thus, switch 30–4 is connected to 10.00 volts whereas switch 30–3 is connected to 1.00 volts. Switch 29–4 is connected to 9.00 volts, switch 28–4 is connected to 8.00 volts and so on to switch 21–4 which is connected to 1.00 volts.

The other side of the switches 21–3 through 30–3 and 21–4 through 30–4 are connected to identical diodes 79 such that the highest voltage back biases the other diodes. The diodes 79 are then connected through identical resistors 80 and 81 to the input of an operational amplifier 82 which has a feedback resistor 83. The output of operational amplifier 82 is connected to a difference value indicator 84. A source of negative potential 86 (10–20 volts) is also connected to the input of the operational amplifier 82 through a resistor 87. The value of resistors 80, 81, and 87 are selected to be very much greater than resistors 51 through 70.

As previously stated, the energization of coil 21 closes switches 21–3 and 21–4, the energization of coil 22 closes switches 22–3 and 22–4, the energization of coil 23 closes switches 23–3 and 23–4 and so on to coil 30 which closes switches 30–3 and 30–4.

In the previous example it was presumed that signals of frequencies of 1 mc., 6 mc. and 8 mc. were received and coils 21, 26, and 28 were energized. An analog average voltage of 5.00 volts was then applied to average value indicator 77. At the same time switches 21–3, 21–4, and 26–3, 26–4, and 28–3, 28–4 will also close. Switch 21–3 will apply 10.0 volts to resistor 80, switch 26–3 will have 5.0 volts applied thereto but its associated diode will be back biased. Likewise, switch 28–3 will have 3.0 volts applied thereto but its associated diode will be back biased. Thus, 10.0 volts will be applied to resistor 80. Likewise, switch 28–4 will have 8.0 volts applied thereto. The 8.0 volts applied through switch 28–4 will back bias the diodes associated with switches 26–4 and 21–4 and 8.0 volts will be applied to resistor 81. The 10.0 voltage, the 8.0 voltage and the −10.0 potential from source 86 are combined at the input to operational amplifier 82. The operational amplifier will produce an output voltage which is the negative of the combined voltages, which in the present example is $$-(10.0+8.00-10.0)=-8$$

The numeric value of the output voltage from operational amplifier will always be one greater than the numeric difference between weighted value, the lowest valued input signal and the highest valued input signal and will be negative.

If only one input signal is applied from signal source 10 the output from operational amplifier is −1.0 volt. For example, if a signal having a frequency of 2 mc. is received, coil 22 is energized and switches 22–3 and 22–4 close. A potential of 9.0 volts is applied to resistor 80 and a potential of 2.0 volts is applied to resistor 81. The 9.0 volts, the 2.0 volts, and the −10.0 volts from source 86 are combined by the operational amplifier 82 to an output voltage of −(+9.0+2.0−10.0)=−1.0 volt.

If a second signal of frequency 8 mc. is now received, coil 28 is energized and switches 28–3 and 28–4 close. The closing of switch 28–3 has no effect because its associated diode is back-biased by the 9.0 volts through switch 22–3, however, the closing of switch 28–4 applies an 8.0 volt signal which back-biases the diode associated with switch 22–4 and 8.0 volts are applied to resistor 81. The 9.0 volts, the 8.0 volts and the −10.0 volts from source 86 are combined by operational amplifier 82 for a total of −(9.0+8.0−10.0)=−7.0. Since the difference between the 2 mc. frequency and the 8 mc. frequency is 6 mc., the output voltage is again numerically one greater than the difference and is negative.

If a third input signal representative of 5 mc. is applied from signal source 10, coil 25 is energized and switches 25–3 and 25–4 will close. The closing of these switches have no effect since the diode associated with switch 25–3 will be back-biased by the 9.0 volts from switch 22–3 and the diode associated with switch 25–4 will be back-biased by the 8.0 volts from switch 28–4. Thus, the resultant output voltage will still be representative of the difference between the highest and lowest frequency received signals.

Difference value indicator 84 may be a voltmeter wherein the extra 1.0 volt in the analog output voltage from amplifier 82 is biased out so as to provide a true indication of the difference between the lowest and highest valued received signals.

Thus, it is seen that when a plurality of input signals are recived from source 10, each manifesting a different numerical value such as frequency values, the average of such numerical values is indicated by indicator 77 and the absolute difference between the lowest and the highest of such numerical values are indicated by indicator 84.

The present invention is not limited to determining the average value and the maximum difference of signal frequencies only, but may be employed with any plurality of inputs which are representative of numerical quantities.

While the invention has been particularly shown and described with reference to a preferred embodiment thereof, it will be understood by those skilled in the art that various changes in form and details may be made therein without departing from the spirit and scope of the invention.

What is claimed is:
1. A system responsive to a plurality of numerically weighted input signals for determining numerical functions thereof comprising:
first means responsive to said plurality of numerically weighted input signals for producing an analog output signal representative of the average numerical value of said plurality of numerically weighted input signals including:
a first analog circuit responsive to said plurality of separately weighted input signals for producing an equal plurality of analog signals in response thereto, each of said analog signals having an analog value representative of a different one of said separately weighted input signals;
means for adding said plurality of analog signals for producing a resultant analog signal representative of the sum of said plurality of analog signals;
a second analog circuit including a plurality of impedance means, each responsive to a separate one of said plurality of separately weighted input signals for producing a total impedance representative of the number of said separately weighted input signals;
and means for applying said resultant analog signal to said total impedance for producing an output analog signal representative of the numeric average of said plurality of separately weighted input signals;
and second means responsive to said plurality of numerically weighted input signals for producing an analog output signal representative of the difference between the maximum and minimum valued ones of said plurality of numerically weighted input signals including:
a first plurality of parallel channels each channel being responsive to a separate one of said plurality of numerically weighted input signals, and wherein the channel responsive to the maximum numerically valued one of said input signal blocks the other of said first plurality of channels and produces an analog signal representative of the value of said maximum numerical input signal;
a second plurality of parallel channels, each channel being responsive to a separate one of said plurality of numerically weighted input signals, and wherein the channel responsive to the minimum numerically valued one of said input signals produces an analog signal representative of the value of said minimum numerical input signal;
and means coupled to said first and second plurality of channels and responsive to said maximum and minimum numerically valued signals therefrom to provide an output analog signal representative of the numerical difference between said maximum and minimum analog signals.

2. A system responsive to a plurality of numerically weighted input signals for determining numerical functions thereof including:
means for producing a separate analog current representative of the value of each of said numerically weighted input signals;
means for combining said separate analog currents into a total analog current which is the sum of each of said separate analog currents;
means for selecting a separate similarly valued impedance for each one of said plurality of input signals;
means for combining said similarly valued impedances into a single impedance circuit;
and means for applying said total analog current to said total impedance circuit for producing an analog output voltage representative of the numerical average value of said input signals.

3. A system according to claim 2 including a first voltage producing means for producing a separate voltage for each of said numerically weighted input signals wherein said voltage values are directly proportional to said numerical weighted values;
means for blocking all but the maximum one of said voltages of said first voltage producing means, said maximum voltage being representative of the maximum numerical weighted input signal;
a second voltage producing means for producing a separate voltage for each of said numerically weighted input signals wherein said voltage value are inversely proportional to said numerically weighted value;
means for blocking all but the maximum one of said voltages of said second voltage producing means, said maximum voltage being representative of the minimum numerical weighted input signal;
and means for combining the maximum signals from said first and second voltage producing means to provide a resultant output signal representative of the numeric difference between said maximum and minimum numerical weighted input signals.

4. A system responsive to a plurality of numerically weighted input signals for determining numerical functions thereof comprising:
first means responsive to said plurality of numerically weighted input signals for producing an analog output signal representative of the average numerical value of said plurality of numerically weighted input signals;
and second means responsive to said plurality of numerically weighted input signals which includes,
a first plurality of parallel channels each channel being responsive to a separate one of said plurality of numerically weighted input signals, and wherein the channel responsive to the maximum numerical valued one of said input signal blocks the other of said first plurality of channels and produces an analog signal representative of the value of said maximum numerical input signal;
a second plurality of parallel channels, each channel being responsive to a separate one of said plurality of numerically weighted input signals, and wherein the channel responsive to the minimum numerically valued one of said input signals produces an analog signal representative of the value of said minimum numerical input signal;
and means coupled to said first and second plurality of channels and responsive to said maximum and minimum numerically valued signals therefrom to provide an output analog signal representative of the numerical difference between said maximum and minimum analog signals.

5. A system responsive to a plurality of numerically weighted input signals for determining numerical functions thereof comprising:
a plurality of switching means responsive to said plurality of weighted input signals for changing state in response thereto;
a first plurality of switch contacts coupled to said switching means for producing an analog output signal representative of the average value of said plurality of weighted input signals, said first plurality of switch contacts including,
a first group of switch contacts connected in parallel circuit, each of said first group of switch contacts being connected in series circuit with one of a plurality of separately valued impedances and each of said first group of switch contacts being coupled to a separate associated one of said bistable devices for connecting said impedance in series therewith to a source of potential when said associated bistable device is actuated;
a second group of switch contacts connected in parallel circuit, each of said second group of switch contacts being connected in series with one of a plurality of similarly valued impedances and each of said second group of switch contacts being coupled to a separate one of said bistable devices for connecting said similarly valued impedance in series therewith to said separately valued impedances associated with said first group of switch contacts;

and means coupled in series with said first group of said switch contacts and their associated separately valued impedances and in parallel with said second group of said switch contacts and their associated similarly valued impedances for providing an output analog signal representative of the numerical average of said numerically weighted input signals;

and a second plurality of switch contacts and associated similarly valued impedances coupled to said switching means for producing an analog output signal from a common voltage source representative of the difference between the maximum and minimum valued ones of said plurality of input signals.

References Cited

UNITED STATES PATENTS 3,168,655    2/1965    Vadus.
3,299,287    1/1967    Staeudle.

FOREIGN PATENTS 1,014,680    4/1964    Great Britain.

MALCOLM A. MORRISON, *Primary Examiner.*

J. F. RUGGIERO, *Assistant Examiner.*